June 11, 1968  R. J. KASPER  3,387,436
ROTARY CUTTER
Filed April 13, 1965  2 Sheets-Sheet 1
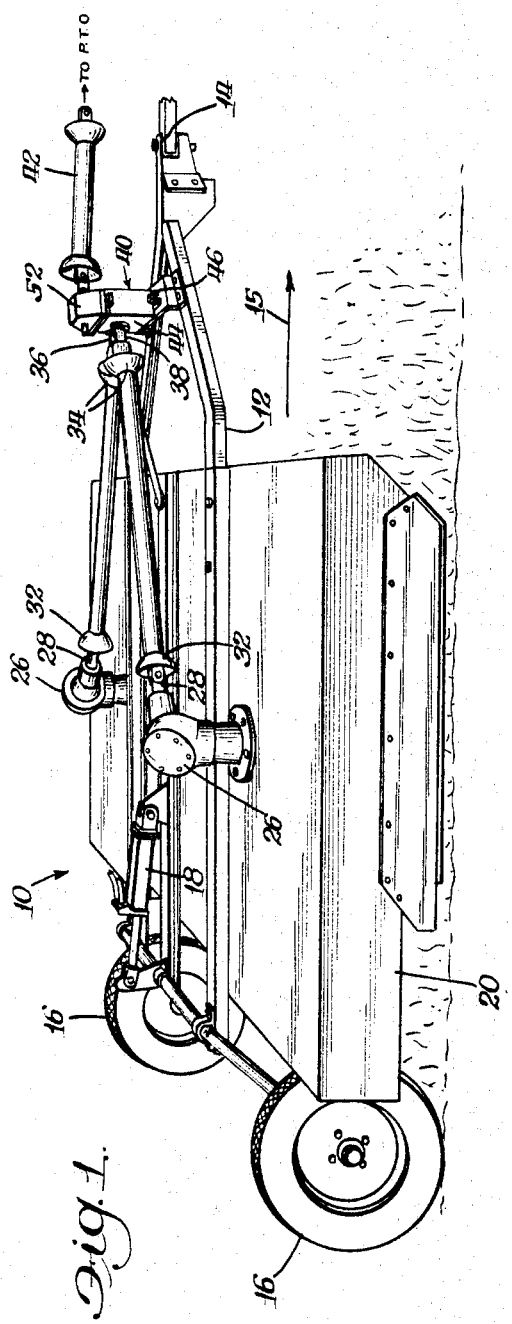
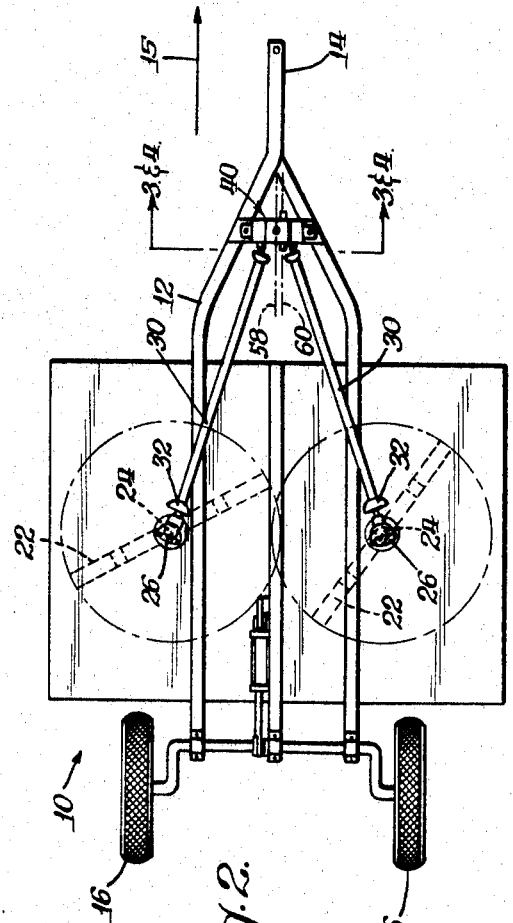
Inventor:
Roman J. Kasper
By John J. Kowalik
Atty.

June 11, 1968  R. J. KASPER  3,387,436
ROTARY CUTTER
Filed April 13, 1965  2 Sheets-Sheet 2
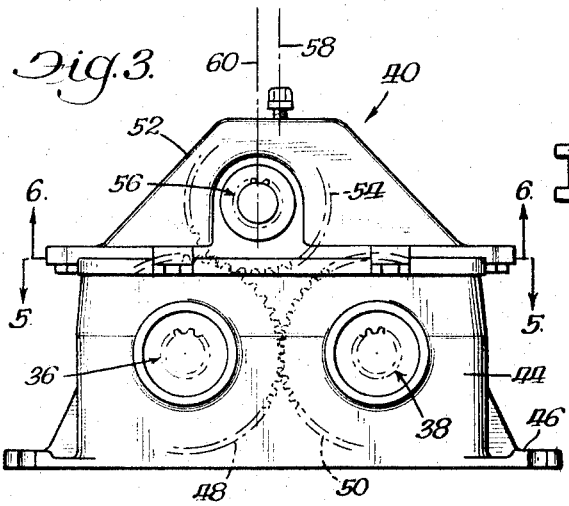
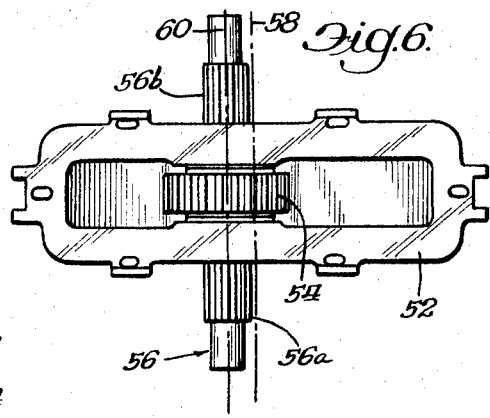
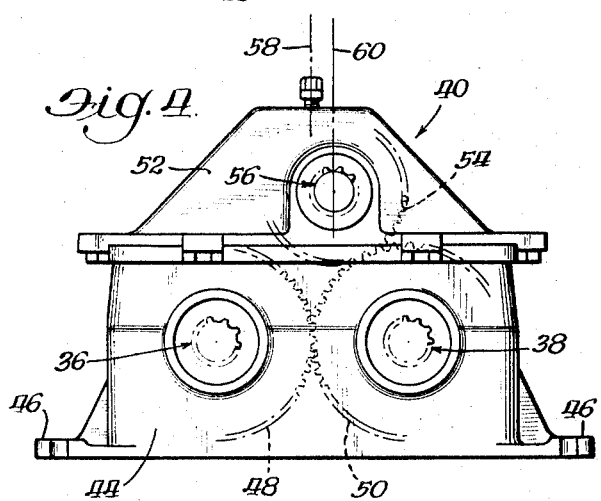
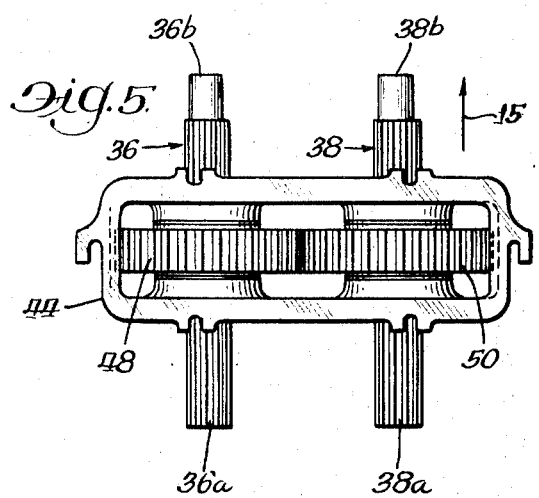
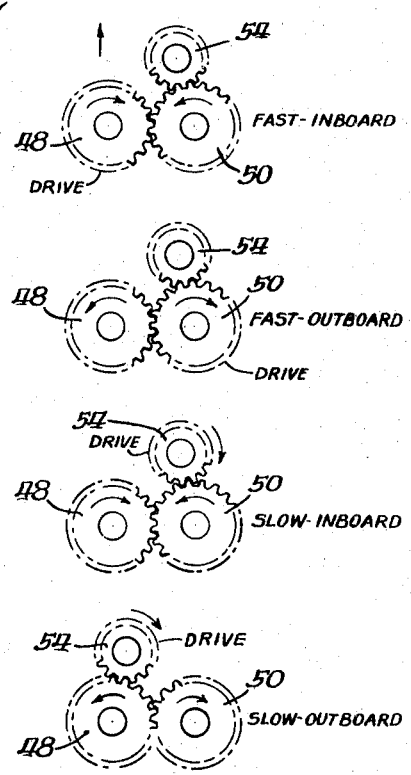
Inventor:
Roman J. Kasper
By John J. Kowalik
Atty.

United States Patent Office 3,387,436
Patented June 11, 1968

3,387,436
ROTARY CUTTER
Roman J. Kasper, Downers Grove, Ill., assignor to International Harvester Company, Chicago, Ill., a corporation of Delaware
Filed Apr. 13, 1965, Ser. No. 447,827
7 Claims. (Cl. 56—6)

ABSTRACT OF THE DISCLOSURE

A mower having plural blades, and a gear box with different speed ratios and reverse providing a transmission for drive to the blades to rotate the blades in plural directions and at different speeds.

---

The present invention relates to rotary cutters.

A rotary cutter of the type to which the present invention is particularly adapted is generally used for cutting, conditioning, and windrowing hay and other crops. The rotary cutter, drawn as by a tractor, includes a pair of rotary cutter blades arranged on vertical axes, the blades being driven by separate drive shafts leading from a common gear box. The drive shafts are driven, through the gear box, by a main drive shaft deriving its power from the tractor.

A main object of the invention is to provide a novel rotary cutter in which the direction of rotation and speed of the blades are optionally changeable to effect different practices of harvesting and processing of the crops.

I have found that by rotating the pair of blades at high speed in a direction such that the blades at their forward sides move outwardly, good cutting and scattering action is obtained. If the speed of rotation of the blades moving as before is reduced, the hay is bruised after being cut, thereby being conditioned and is windrowed to the rear. Fast rotation of the blades inwardly at their forward ends obtains good cut with windrowing, and slower inward rotation of the blades obtains conditioning and windrowing. Also in previously cut hay, this machine can be used to windrow and condition or to cut, windrow and condition.

Another and more specific object is to provide a multi-speed drive of the foregoing general character which includes a gear box having a plurality of gears through which the drive is transmitted, wherein a novel arrangement is provided for changing the gear ratio and direction of drive between the various gears to obtain a simple and quick adjustment of the blade rotational direction and speed.

A further object is to provide a novel drive of the foregoing general character including a plurality of meshing gears, in which the change in direction of rotation of the gears is effected by relocating at least one of the gears for changing its meshing relation with other gears.

A still more specific object is to provide a drive of the character just referred to including a gear box made in parts, certain of the gears being located in respective ones of the parts of the gear box, and in which one of the parts is selectively positionable in opposite positions whereby the gear carried therein is brought respectively into meshing engagement with different gears of the other part of the gear box.

Other objects and advantages of the invention will appear from the following detail description taken in conjunction with the accompanying drawings in which:

FIGURE 1 is a perspective view of a rotary cutter of the character to which the present invention is particularly adapted, and including the novel drive of the present invention;

FIGURE 2 is a smaller scale plan view of the device of FIGURE 1;

FIGURE 3 is an elevational view of the gear box of the drive of the present invention and oriented according to line 3—3 of FIGURE 2;

FIGURE 4 is a view similar to FIGURE 3 but showing the reversible part of the gear box in reverse position relative to that of FIGURE 3, this view being oriented according to line 4—4 of FIGURE 2;

FIGURE 5 is a view of the interior of the lower part of the gear box, taken at line 5—5 of FIGURE 3;

FIGURE 6 is a view of the interior of the upper part of the gear box, taken at line 6—6 of FIGURE 3; and FIGURE 7 is a diagram of the gears of the gear box indicating the different positions of the reversible gear, as well as the different directions of rotation of the gears, and different speeds thereof.

Referring now in detail to the drawings attention is directed first to FIGURES 1 and 2 showing a rotary cutter and the novel drive of the present invention. The rotary cutter, indicated in its entirety at 10, in overall construction and except for the drive of the present invention as described in detail hereinbelow, is of known construction, and includes a frame 12 having a tongue 14 by which the cutter is drawn in its operation in the direction of the arrow 15 as by a tractor. Mounted on the rear end of the frame 12 are wheels 16 which may be raised and lowered by suitable means such as a hydraulic power device 18. A housing 20 is carried by the frame 12 and generally encloses a pair of cutter blades 22 arranged side by side and mounted on the lower end of vertical shafts 24 the upper ends of which are connected in gear boxes 26. Extending laterally from the gear boxes are shafts 28 connected with separate drive shafts 30, preferably through universal joints 32. The drive shafts 30 converge forwardly where through other universal joints 34 where they are connected with shafts 36 and 38 extending rearwardly from the gear box 40 constituting an important component of the present invention.

Leading forwardly from the gear box 40 is a single main drive shaft 42 connected with the gear box in a manner described hereinbelow. This main drive shaft 42 is connected with the power take off drive of the tractor in a known manner.

A rotary cutter of the present general character as indicated above, and particularly with the novel gear box 40 incorporated therein, is useful for cutting, conditioning, and windrowing hay and other crops. The cutter blades 22 are made to rotate at different speeds and in different directions to produce different results, such as those mentioned namely, cutting, conditioning, windrowing, etc. Certain operations require fast speed of the cutter blades, while others require slow speed, and similarly certain operations require the cutter blades to operate in one direction, e.g. in inboard directions considered relative to the longitudinal centerline of the cutter, while others require that they rotate in outboard direction, the cutter blades being arranged for operating in mutually opposite directions, through the gearing arrangement in the gear box, as will be understood. The various end operations to which the rotary cutter is put will not be further described in detail herein and the remaining description will be directed toward the arrangement for producing the different directions of rotation of the cutter blades and the different speeds thereof. It will be understood that the different directions of rotation and speeds of the cutter blades are achieved for a given single direction of rotation and speed of the drive shaft 42.

Referring now in detail to the gear box 40 as shown in FIGURES 3 to 6, this gear box includes a lower housing section 44 mounted on a suitable portion of the cutter such as adjacent the forward end of the frame 12, being mounted in any suitable manner, having lugs 46, for example, for that purpose. Journalled in the housing member 44 are a pair of intermeshing gears 48 and 50 (FIGURE 5) mounted on the shafts 36 and 38 respectively identified above. These gears 48 and 50 are preferably of the same size and are permanently mounted in the gear box in the normal operation of the cutter.

The shafts 36 and 38 have splined ends 36a and 38a extending rearwardly out of the housing for operative connection with the drive shafts 30 in a known manner, and splined front end portions 36b and 38b extending forwardly out of the housing for selective connection with the rear end of the main drive shaft 42, which may be done by the operator in the field in a known manner.

The housing 40 includes a top or cover section 52 in which is journalled a spur gear 54 mounted on a shaft 56 having splined ends 56a and 56b extending respectively to the exterior on opposite sides of the housing. This spur gear 54 is of smaller diameter than the gears 48 and 50 for producing reduced speed as explained hereinbelow.

The spur gear 54 is offset from the central vertical fore-and-aft vertical plane indicated by the line 58, the vertical plane of the axis of the gear 54 being indicated by the line 60.

The top housing section 52 can be fitted and secured to the lower section in each of opposite positions shown respectively in FIGURES 3 and 4, the two housing sections having interengaging surfaces lying in a common plane and the two sections being secured together by any suitable means, preferably by quick-disconnect devices. In one position of the top housing section, e.g. that shown in FIGURE 3, the spur gear 54 meshes with the gear 50 but not with the other gear 48, while in the opposite position as shown in FIGURE 4, the spur gear meshes with the other gear 48, but not with the gear 50.

In the use of the device, if the operator wishes the cutter blades to be rotated at fast speed, he connects the main drive shaft 42 to one or the other of the shafts 36, 38, depending upon which direction he wishes them to be rotated. This produces relatively fast speed of the cutter blades. On the other hand if he wishes them to be rotated at slow speed, he connects the main drive shaft 42 with the shaft 56 carrying the spur gear, the difference in the diameters of the gears producing the slower speed of the cutter blades. The direction of rotation of the cutter blades in slow speed is dependent upon the position of the top housing section 52 and the corresponding meshing relation between the spur gear 54 and the respective gears 48, 50. To reduce the opposite directions of rotation of the cutter blades from that produced in the position of the top housing section in which the operator finds it, he merely reverses the position of the top housing section as described above, between the positions shown in FIGURES 3 and 4.

FIGURE 7 shows diagrammatically the four different conditions made possible by this drive. The representations in FIGURE 7 of the four different conditions include an indication of the gear to which the main drive shaft is connected and the direction of rotation and speed of the gears.

The drive of this invention is extremely simple but very flexible, being capable of providing four different drive conditions, in the use of which it is only necessary to make two simple maneuvers for any of the conditions, namely, to place the top housing section in the third position, and to connect the main drive shaft with the intended one of the gears in the gear box. There is no complicated structure such as require adjustments of any parts or elements, the parts all being fixed in any given position of the top section of the gear box.

While I have herein shown a preferred embodiment of the invention, it will be understood that changes may be made therein within the scope of the appended claims.

I claim:

1. A rotary cutter of the character disclosed comprising a pair of cutter blades, a pair of individual drive shafts operatively connected respectively with the cutter blades, a gear box including a pair of intermeshing gears operatively connected with respective ones of said individual drive shafts, a spur gear, means for selectively positioning the spur gear in mesh with either of said gears, and a single main drive shaft selectively connectable with any of the three gears.

2. A rotary cutter comprising a pair of cutter bars mounted side by side for rotation on vertical axes, an individual drive shaft operatively connected with each cutter blade, a gear box including a pair of fixed intermeshing gears operatively connected respectively with said individual drive shafts, said gear box also including a spur gear, the gear box including a section permanently mounting said spur gear, said section being selectively relative to the remainder of the gear box for meshing the spur gear with either of the other gears, and a main drive shaft selectively operatively connectable with any of said gears.

3. A rotary cutter comprising a pair of cutter blades, a gear box including a pair of intermeshing relatively large gears, drive means operatively connecting the gears respectively with said cutter blades, a spur gear of smaller diameter than the other gears, means mounting the spur gear selectively positionable for correspondingly positioning the spur gear in opposite positions along a line transverse to the axes of the other gears and in mesh with respective ones of the other gears, and a main drive shaft selectively connectable with any of the gears.

4. A rotary cutter adapted for moving along a line, comprising a frame, a pair of cutter blades, a gear box mounted on the frame adjacent the leading end of the cutter, a pair of intermeshing main gears of substantially the same size mounted in the gear box, the gears being mounted on shafts extending through the gear box both fore and aft, individual drive means respectively interconnecting the shafts rearwardly of the gear box with the cutter blades, a spur gear, means mounting the spur gear in the gear box in mesh with one of the main gears, said means including a shaft on which the spur gear is mounted having ends projecting fore and aft in a meshing position of the spur gear, said means being reversable about a vertical axis for re-positioning the spur gear for selectively meshing it with either of the main gears, and in any position of the spur gear one end of the shaft mounting it extending forwardly, and a single main drive shaft selectively connectable with the forward ends of the gear shafts.

5. A rotary cutter adapted for movement along a line, comprising a frame, a pair of cutter blades mounted on the frame, a gear box mounted on the frame adjacent the leading end thereof, said gear box including a lower section, a pair of intermeshing main gears in the lower section of substantially the same diameter, shafts mounting said main gears extending through the gear box both fore and aft, drive means respectively interconnecting said shafts with the rotary cutter blades, the gear box also including a top section, a spur gear of different diameter from the main gears in the top section, a shaft mounting the spur gear and extending at both ends through the top section, said top section being fitted to the lower section and when so fitted forming therewith an enclosure enclosing all of said gears, said top section being positionable in each of opposite positions about a vertical axis, the spur gear being offset from the central vertical axis of the housing whereby in each of opposite positions of the top section the spur gear meshes with opposite ones of the main gears, the shaft mounting the spur gear extending fore and aft of the gear box in each position of thet upper section, and a main drive shaft selectively connectable with any of said gear shafts forwardly of the gear box.

6. For use in a mower having a plurality of blades, a gear box comprising in combination a lower housing section, a pair of intermeshing main gears in the lower housing section, shafts mounting the gears extending through the housing section at both ends, a top housing section, a spur gear in the top housing section of different diameter from the main gears, a shaft in the top housing section mounting said spur gear and extending at both ends through the housing, said spur gear being offset transversely from the center of the gear box, the top section of the housing being selectively positionable in opposite positions of rotation about a central vertical axis thereof whereby in each of the opposite positions thereof the spur gear meshes with a corresponding one of the main gears, and means selectively connecting all of said shafts exteriorly of the housing with driving means and respective one of the blades to rotate the same in different directions and at different speeds.

7. A mower having a frame and a plurality of cutter blades mounted thereon, a drive for the blades, and a power train between the drive and the cutter blades including a first gear relationship for rotating the blades counterrotationally in a first direction at a first speed for cutting and scattering material, a second gear relationship for counterrotationally rotating the blades in a second direction at a slow speed for cutting and windrowing the crops and a third gear relationship for rotating the blades in the second direction at a higher speed than said second relationship for chopping hard to cut material.

References Cited
UNITED STATES PATENTS

| | | | |
|---|---|---|---|
| 726,738 | 4/1903 | Nye | 74—670 |
| 1,198,589 | 9/1916 | Shellabarger | 172—111 |
| 3,001,409 | 9/1961 | Von Fumetti | 74—11 |
| 3,121,302 | 2/1964 | Northcote et al. | 56—503 X |

ANTONIO F. GUIDA, *Primary Examiner.*